(12) United States Patent
Sheehan et al.

(10) Patent No.: US 8,990,561 B2
(45) Date of Patent: Mar. 24, 2015

(54) PERVASIVE PACKAGE IDENTIFIERS

(75) Inventors: John M. Sheehan, Cambridge, MA (US); Howard S. Kapustein, Issaquah, WA (US); Jerome Thomas Holman, Redmond, WA (US); Scott B. Graham, Seattle, WA (US); Sermet Iskin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 13/228,695

(22) Filed: Sep. 9, 2011

(65) Prior Publication Data
US 2013/0062401 A1 Mar. 14, 2013

(51) Int. Cl.
*G06F 17/00* (2006.01)
*G06F 9/46* (2006.01)

(52) U.S. Cl.
CPC ............... *G06F 17/00* (2013.01); *G06F 9/468* (2013.01)
USPC ........................................................ 713/167

(58) Field of Classification Search
CPC ..... G06F 21/6218; G06F 17/00; G06F 9/468; H04L 63/0428
USPC ........................................................ 713/167
See application file for complete search history.

(56) References Cited

U.S. PATENT DOCUMENTS

| | | | |
|---|---|---|---|
| 6,117,187 A | 9/2000 | Staelin | |
| 6,151,643 A * | 11/2000 | Cheng et al. | 710/36 |
| 6,308,173 B1 | 10/2001 | Glasser et al. | |
| 6,697,569 B1 | 2/2004 | Gomez et al. | |
| 6,725,452 B1 | 4/2004 | Te'eni et al. | |
| 6,865,659 B2 * | 3/2005 | Montemayor | 711/209 |
| 7,031,276 B2 | 4/2006 | Inoue | |
| 7,151,832 B1 | 12/2006 | Fetkovich et al. | |
| 7,152,243 B2 | 12/2006 | Bourne et al. | |
| 7,337,442 B2 | 2/2008 | VoBa et al. | |
| 7,392,383 B2 | 6/2008 | Basibes et al. | |
| 7,401,235 B2 | 7/2008 | Mowers et al. | |
| 7,472,377 B2 * | 12/2008 | Anand et al. | 717/121 |
| 7,475,396 B2 * | 1/2009 | Kapoor | 717/178 |
| 7,478,094 B2 | 1/2009 | Ho et al. | |
| 7,542,988 B1 | 6/2009 | Cook et al. | |
| 7,607,131 B2 | 10/2009 | Oe et al. | |
| 7,650,501 B1 * | 1/2010 | Brunette et al. | 713/165 |

(Continued)

FOREIGN PATENT DOCUMENTS

| | | |
|---|---|---|
| CN | 101616719 | 12/2009 |
| EP | 2086206 | 8/2009 |
| WO | WO-0205184 | 1/2002 |

OTHER PUBLICATIONS

Martín Abadi et al. A Logical Account of NGSCB. Microsoft Research, Sep. 2004.*

(Continued)

*Primary Examiner* — Saleh Najjar
*Assistant Examiner* — Oleg Korsak
(74) *Attorney, Agent, or Firm* — Timothy Churna; Kate Drakos; Micky Minhas

(57) ABSTRACT

A package identifier for a package from which an application is installed on a computing device is obtained. The package identifier is assigned to each of one or more processes created for running the application and, for each of the one or more processes, whether the process is permitted to access a resource of the computing device is determined based at least in part on the package identifier.

19 Claims, 7 Drawing Sheets

(56) References Cited

U.S. PATENT DOCUMENTS

| | | | |
|---|---|---|---|
| 7,650,627 B1 | 1/2010 | Stancheva et al. | |
| 7,698,393 B2 | 4/2010 | Milstein et al. | |
| 7,716,734 B2 | 5/2010 | Birrell et al. | |
| 7,779,265 B2 | 8/2010 | Dubhashi et al. | |
| 7,925,875 B2* | 4/2011 | McAvoy | 713/2 |
| 7,934,087 B2* | 4/2011 | Carter | 713/150 |
| 8,001,528 B2* | 8/2011 | Bernabeu-Auban et al. | 717/121 |
| 8,073,442 B2 | 12/2011 | Frank et al. | |
| 8,185,889 B2 | 5/2012 | Kinder et al. | |
| 2004/0030926 A1 | 2/2004 | Clark | |
| 2004/0039924 A1 | 2/2004 | Baldwin et al. | |
| 2005/0091535 A1* | 4/2005 | Kavalam et al. | 713/201 |
| 2005/0132350 A1 | 6/2005 | Markley et al. | |
| 2005/0154738 A1 | 7/2005 | Thomas et al. | |
| 2006/0048129 A1 | 3/2006 | Napier et al. | |
| 2006/0155986 A1* | 7/2006 | Kleinhuis et al. | 713/156 |
| 2007/0192500 A1 | 8/2007 | Lum | |
| 2007/0208857 A1 | 9/2007 | Danner et al. | |
| 2007/0234412 A1 | 10/2007 | Smith et al. | |
| 2007/0239981 A1 | 10/2007 | Lessing | |
| 2008/0120707 A1 | 5/2008 | Ramia | |
| 2008/0162698 A1 | 7/2008 | Hopen et al. | |
| 2008/0201705 A1 | 8/2008 | Wookey | |
| 2008/0244723 A1 | 10/2008 | Brewster et al. | |
| 2008/0282354 A1 | 11/2008 | Wobber et al. | |
| 2009/0100421 A1 | 4/2009 | Flaming et al. | |
| 2009/0144659 A1 | 6/2009 | Do | |
| 2009/0170431 A1 | 7/2009 | Pering et al. | |
| 2009/0222894 A1 | 9/2009 | Kenny et al. | |
| 2009/0249283 A1 | 10/2009 | Bourdon | |
| 2009/0307684 A1 | 12/2009 | Best et al. | |
| 2009/0327900 A1 | 12/2009 | Noll et al. | |
| 2010/0058320 A1 | 3/2010 | Milligan et al. | |
| 2010/0221999 A1 | 9/2010 | Braun et al. | |
| 2010/0287513 A1 | 11/2010 | Singh et al. | |
| 2010/0287547 A1 | 11/2010 | Korkishko et al. | |
| 2010/0318997 A1 | 12/2010 | Li et al. | |
| 2011/0098030 A1 | 4/2011 | Luoma | |
| 2011/0125799 A1 | 5/2011 | Kandasamy et al. | |
| 2011/0231836 A1 | 9/2011 | Wookey | |
| 2011/0252417 A1 | 10/2011 | Cui et al. | |
| 2012/0240236 A1 | 9/2012 | Wyatt et al. | |
| 2012/0297288 A1 | 11/2012 | Mansouri | |
| 2013/0065526 A1 | 3/2013 | Pottier et al. | |
| 2013/0067459 A1 | 3/2013 | Sannidhanam et al. | |
| 2013/0283377 A1 | 10/2013 | Das et al. | |
| 2014/0173071 A1 | 6/2014 | Hazen | |
| 2014/0344667 A1 | 11/2014 | Risney et al. | |

OTHER PUBLICATIONS

"Dependency Resolution Rules", retrieved from http://nuget.codeplex.com/wikipage?title=Dependency%20Resolution on Jul. 15, 2011, 3 pages.

"Structural Analysis", retrieved from http://www.headwaysoftware.com/products/structure101/structrual-analysis.php#deep-structural-analysis-section on Jul. 15, 2011, 10 pages.

Burrows, Daniel "Modelling and Resolving Software Dependencies", retrieved from http://people.debian.org/~dburrows/model.pdf, (Jun. 15, 2005), pp. 1-16.

Galindo, Jose A., et al., "Debian Packages Repositories as Software Product Line Models. Towards Automated Analysis", retrieved from http://www.isi.us.es/~segura/files/papers/galindo10-acota.pdf; Proceedings of the First International Workshop on Automated Configuration and Tailoring of Applications, (2010), 6 pages.

Lange, Thomas "FAI Guide (Fully Automatic Installation)", retrieved from http://debian.uni-duisburg-essen.de/misc/FAI/fai-guide_2.5.3.pdf, (Dec. 5, 2005), 70 pages.

Manzoor, Umar et al., "Silent Unattended Installation Package Manager—SUIPM", retrieved from http://ieeexplore.ieee.org/stamp/stamp.jsp?tp=&arnumber=5172599; International Conference on Computational Intelligence for Modelling Control & Automation, (Dec. 10-12, 2008), pp. 55-60.

"Security for runtime resources: Access control lists", Retrieved at <<http://publib.boulder.ibm.com/infocenter/wmbhelp/v6r1m0/index.jsp?topic=/com.ibm.etools.mft.doc/ap01380_.htm>>, Retrieved Date: Jul. 27, 2011, pp. 3.

"Access Control Lists in Linux", Retrieved at <<http://users.suse.com/~agruen/ac/chapter/fs_acl-en.pdf>>, (Jul. 18, 2003), 13 pages.

"Amid Privacy Concerns, Apple Has Started Rejecting Apps That Access UDIDs", Retrieved from <http://techcrunch.com/2012/03/24/apple-udids/> on Jul. 9, 2012, (Mar. 24, 2012) ,1 page.

"Android Developers Security and Permissions", Retrieved from: <http://developer.android.com/guide/topics/security/security.html> on Jul. 18, 2011, 5 pages.

"Authorization API", Retrieved from <http://developers.cloudmade.com/projects/show/auth> on Jul. 9, 2012, 3 pages.

"CFUUID Reference", Retrieved from <https://developer.apple.com/library/mac/documentation/CoreFoundation/Reference/CFUUIDRef/CFUUIDRef.pdf>, (Jun. 11, 2012), 16 pages.

"Class StreamSource", Retrieved from <http://docs.oracle.com/javase/6/docs/api/javax/xml/transform/stream/StreamSource.html> on Mar. 12, 2013, (2011), 6 pages.

"ClickOnce Security and Deployment", Retrieved at <<http://msdn.microsoft.com/en-us/library/t71a733d%28d=printer%29.aspx>> on Mar. 15, 2013, 4 pages.

"Customizing the Content, Look and Feel of XML Data", Retrieved from <https://docs.tibco.com/pub/hawk/4.9.0_november_2010/html/tib_hawk_http_adapter_user_guide/wwhelp/wwhimpl/common/html/wwhelp.htm#context=tib_hawk_http_adapter_user_guide&file=httpAdap.3.05.htm> on Mar. 12, 2013, (Nov. 9, 2010), 3 pages.

"Identifying App Installations", Retrieved from <http://android-developers.blogspot.in/2011/03/identifying-app-installations.html>, (Mar. 30, 2011), 4 pages.

"Loading HTML Content from a Stream", Retrieved from <http://msdn.microsoft.com/en-us/library/aa752047(v=vs.85).aspx> on Mar. 12, 2013, (Apr. 10, 2010), 5 pages.

"LoKast shares media between iPhones and Android phones", retrieved from <<http://venturebeat.com/2010/07/21/lokast-shares-media-between-iphones-and-android-phones/>>, (Jul. 21, 2010), 3 pages.

"Network Policy Settings Properties", Retrieved from: <http://technet.microsoft.com/en-us/library/cc772474%28WS.10%29.aspx> on Jul. 25, 2011, 1 page.

"SecureUDID", Retrieved from <http://www.secureudid.org/> on Dec. 11, 2012, 3 pages.

"Securing the Process Control Network", *Enterasys Secure Networks*, Available at <http://www.enterasys.com/company/literature/threat-mgmt-process-control-wp.pdf>, (Apr. 2009), 6 pages.

"User Accounts & Admin Privelages", Retrieved at <http://www.techno-kitten.com/Changes_to_PowerBuilder/9_New_in_Power...B111_New_-_User_Accounts_and_Aipb111_new_-_user_accounts_and_a.html>, Retrieved Date: Jul. 29, 2011,, 2 pages.

Abadi, Martin et al., "Access Control in a World of Software Diversity", *HTOS '05*, available at <http://research.microsoft.com/pubs/54665/accesscontrolwithdiversity.pdf>, (Jun. 2005), 6 pages.

Beede, et al., "MyShield: Protecting Mobile Device Data via Security Circles", *Technical Report CU-CS-1091-12*, Retrieved from <https://www.cs.colorado.edu/department/publications/reports/docs/CU-CS-1091-12.pdf> on Jul. 9, 2012, (Jan. 29, 2012), 14 pages.

Begemann, Ole "UDID Replacement APIs in iOS 6", Retrieved from <http://oleb.net/blog/2012/09/udid-apis-in-ios-6/> on Dec. 11, 2012, (Sep. 20, 2012), 4 pages.

Egele, et al., "PiOS: Detecting Privacy Leaks in iOS Applications", *In 18th Annual Network and Distributed System Security Symposium*, Retrieved from <https://www.seclab.tuwien.ac.at/papers/egele-ndss11/pdf>, (Feb. 2011), 15 pages.

Engelsma, Jonathan R., et al., "EncounterEngine: Integrating Bluetooth User Proximity Data into Social Applications", *IEEE International Conference on Wireless & Mobile Computing, Networking & Communication*, (2008), pp. 502-507.

Eno, et al., "How to find serial number of Android device?", Retrieved from <http://stackoverflow.com/questions/2322234/how-to-find-serial-number-of-android-device>, (Feb. 23, 2012), 6 pages.

(56) References Cited

OTHER PUBLICATIONS

Esbensen, Morten et al., "Pour Images—An Interactive System for Sharing Images", (2010), 9 pages.

Kitz, Georg "GEKITZ" "UIDevice with UniqueIdentifier for iOS 5", Retrieved from <https://github.com/gekitz/UIDevice-with-UniqueIdentifier-for-iOS-5> on Dec. 11, 2012, 5 pages.

Kortuem, Gerd et al., "Sensing and Visualizing Spatial Relations of Mobile Devicse", *UIST '05 Proceedings of the 18th Annual ACM Symposium on User Interface Software and Technology,*, (Oct. 2005), 10 pages.

Rekimoto, Jun et al., "Proximal Interactions: A Direct Manipulation Technique for Wireless Networking", (Aug. 2003), 8 pages.

Rodriguez, Jamie "Windows Phone Capabilities Security Model", Retrieved from: <http://blogs.msdn.com/b/jaimer/archive/2010/04/30/windows-phone-capabilities-security-model.aspx> on Jul. 18, 2011,(Apr. 30, 2010), 3 pages.

Smith, Eric "iPhone Applications & Privacy Issues: An Analysis of Application Transmission of iPhone", Retrieved from <http://www.kompatscher.biz/phocadownload/iPhone-Applications-Privacy-Issues.pdf>, (Oct. 1, 2010),19 pages.

Steinberg, et al., "A Web Middleware Architecture for Dynamic Customization of Web Content for Wireless Clients", *Proceedings of the 11th International Conference on World Wide Web*, Available at <http://www2002.org/CDROM/refereed/483/>,(May 7, 2002), 21 pages.

Xing, Bo et al., "Proximeter: Enabling Mobile Proximity-Based Content Sharing on Portable Devices", *IEEE International Conference on Pervasive Computing and Communications*, PerCom 2009, (Mar. 2009), 3 pages.

"Non-Final Office Action", U.S. Appl. No. 13/229,446, Oct. 22, 2013, 16 pages.

"Final Office Action", U.S. Appl. No. 13/229,446, Apr. 9, 2014, 19 pages.

"Foreign Office Action", CN Application No. 201210335798.6, Sep. 23, 2014, 13 pages.

"Non-Final Office Action", U.S. Appl. No. 13/230,640, Oct. 21, 2014, 15 pages.

"Non-Final Office Action", U.S. Appl. No. 13/229,446, Oct. 23, 2014, 17 pages.

"Non-Final Office Action", U.S. Appl. No. 13/714,389, Jan. 5, 2015, 9 pages.

\* cited by examiner

PERVASIVE PACKAGE IDENTIFIERS

BACKGROUND

Computers typically have multiple installed applications, and oftentimes run multiple applications concurrently. These applications typically include executable code, resources such as images and/or text, and so forth. Despite the presence of these various applications, it remains difficult to reliably identify these applications and the resources of the applications. Thus, it remains difficult to perform various operations on computers that rely on the identities of applications and their resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a package identifier for a package from which an application is installed on a computing device is obtained. The package identifier is assigned to each of one or more processes created for the application and, for each of the one or more processes, whether the process is permitted to access a resource of the computing device is determined based at least in part on the package identifier.

In accordance with one or more aspects, a package identifier is obtained from a package obtain as part of installing one or more applications from the package on a computing device. A subset of elements of the package identifier are used as a family identifier of the package. The family identifier is assigned to each of one or more processes created for the one or more applications. The family identifier can be used in various manners, for example to restrict access to a resource so that only processes that are assigned the family identifier can access the resource.

BRIEF DESCRIPTION OF THE DRAWINGS

The same numbers are used throughout the drawings to reference like features.

DETAILED DESCRIPTION

Pervasive package identifiers are discussed herein. An application and/or other code, libraries, resources, and so forth is distributed as part of a package. A package has an associated package identifier that is based on one or more elements, such as a name of the package, a publisher of the package, an architecture of the package, a resource type of the package, and/or a version of the package. When the application is installed on a device, the package identifier is maintained in a protected manner so that the package identifier is accessible to the operating system of the device but not to other applications running on the device. When running an application installed from the package, one or more processes are created each of which is assigned a security identifier based on the package identifier. This security identifier can be used in a variety of different manners, such as to permit access to a storage area dedicated to applications installed from the package, to permit communication with other processes, and so forth.

Figure 1:
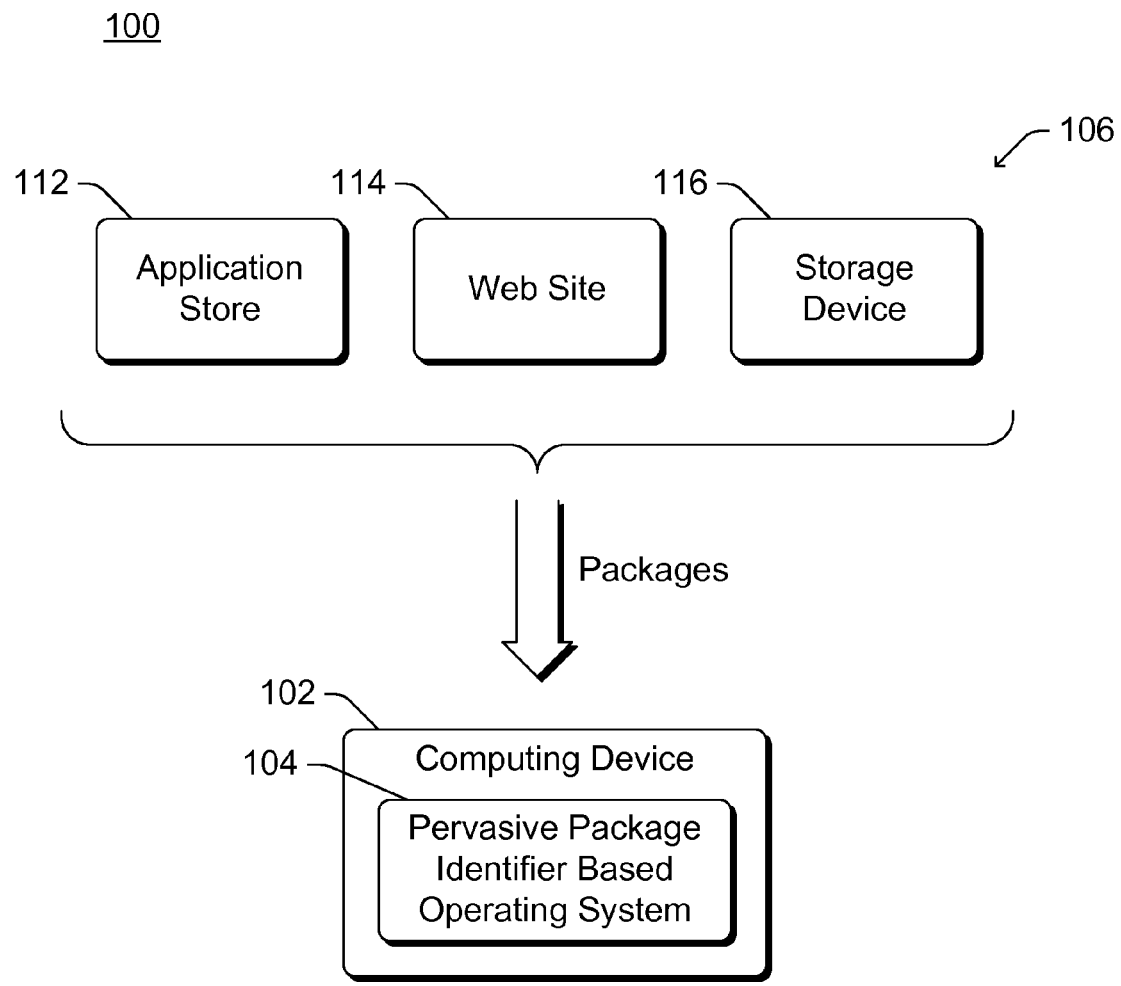
FIG. 1 illustrates an example system implementing the pervasive package identifiers in accordance with one or more embodiments.

FIG. 1 illustrates an example system 100 implementing the pervasive package identifiers in accordance with one or more embodiments. System 100 includes a computing device 102, which can be a variety of different types of devices, such as a physical device or a virtual device. For example, computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 102 can also be a virtual device, such as a virtual machine running on a physical device. A virtual machine can be run on any of a variety of different types of physical devices (e.g., any of the various types listed above).

Computing device 102 includes a pervasive package identifier based operating system 104 that installs applications in packages on computing device 102 and manages running of those applications on computing device 102. An application is included in a package for deployment, and a package includes one or more components or modules for one or more applications. These components or modules can include binary code that is executed as part of an application or code that is interpreted or otherwise processed as part of an application, text or images that are part of (resources of) the application or other data that is part of the application, a library that is part of or used by the application and so forth.

Computing device 102 obtains packages from one or more of a variety of different package sources 106. Multiple packages can be obtained together (e.g., as part of a deployment collection for one or more applications), and/or individual packages can be obtained from multiple sources. Package sources 106 can include remote sources, such as an application store 112 or a Web site 114. Remote sources can be accessed via a variety of different networks, such as the Internet, a local area network (LAN), a public telephone network, an intranet, other public and/or proprietary networks, combinations thereof, and so forth. Package sources 106 can also include local sources, such as storage device 116. Storage device 116 can be a variety of different storage devices, such as a magnetic disk, an optical disc, a Flash memory device, and so forth. Local sources can be included as part of computing device 102, can be removable devices that are coupled to and de-coupled from computing device 102, can be devices in coupled to computing device 102 via a wired and/or wireless connection, and so forth.

Figure 2:
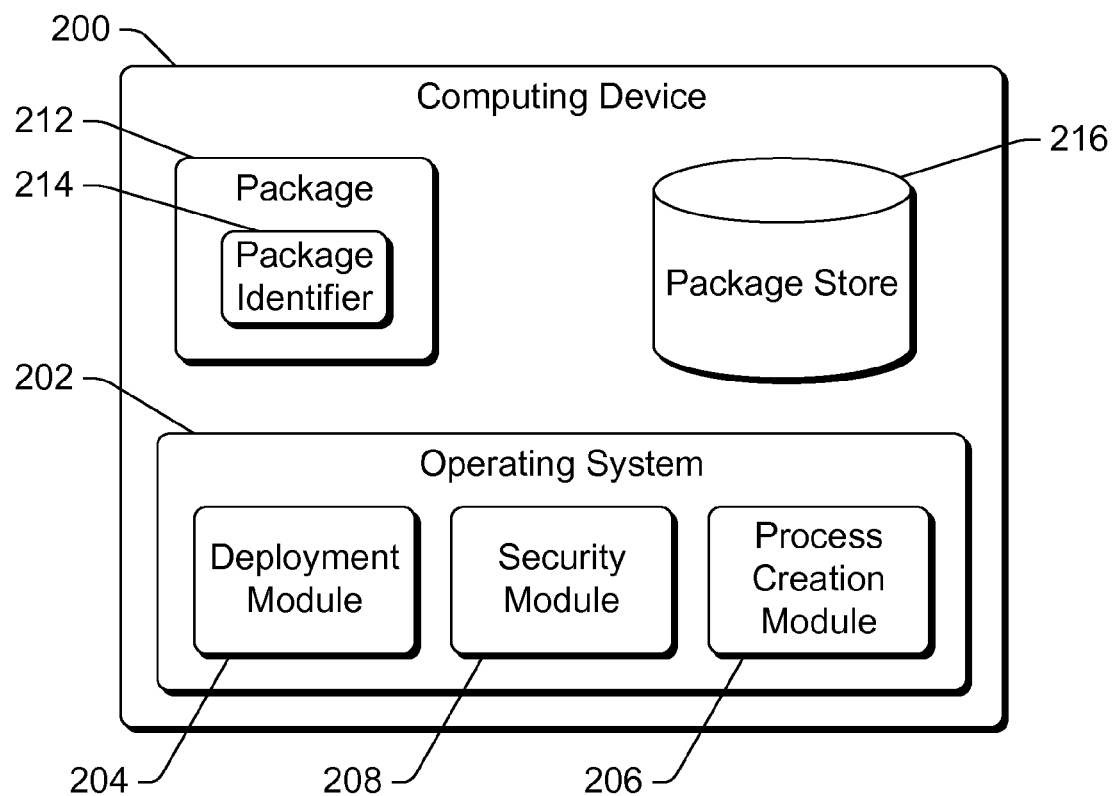
FIG. 2 illustrates an example computing device implementing the pervasive package identifiers in accordance with one or more embodiments.

FIG. 2 illustrates an example computing device 200 implementing the pervasive package identifiers in accordance with one or more embodiments. Computing device 200 can be, for example, a computing device 102 of FIG. 1. Computing device 200 includes an operating system 202, which can be an operating system 104 of FIG. 1, that includes a deployment module 204, a process creation module 206, and a security module 208. Deployment module 204 manages installation of one or more applications, based on a package 212, on computing device 200. Although a single package 212 is illustrated in FIG. 2, it should be noted that deployment module 204 can manage installation of multiple applications, based on multiple packages, on computing device 200. Process creation module 206 manages the creation of processes on computing device 200 based on applications installed on computing device 200. Security module 208 manages access to various processes, locations, resources, and so forth on computing device 200. This access is based at least in part on a package identifier of package 212, as discussed in more detail below.

Figure 3:
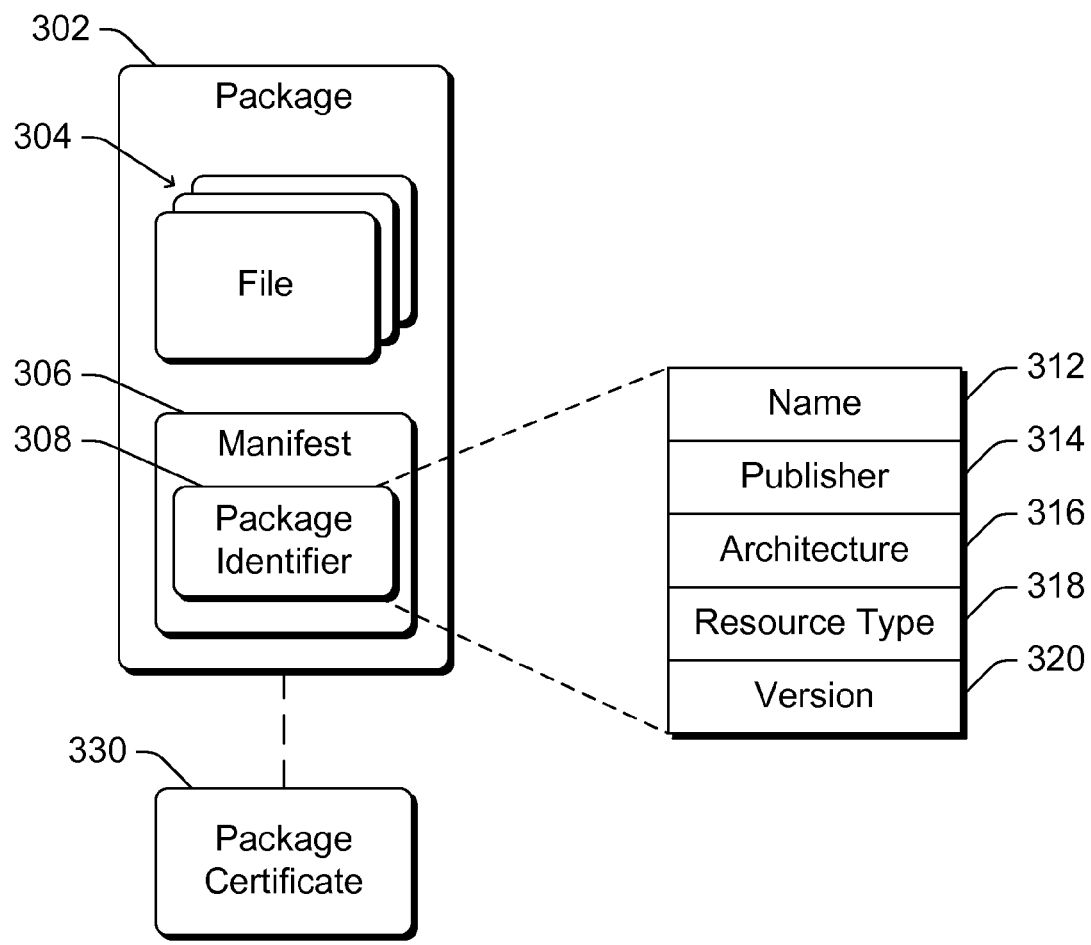
FIG. 3 illustrates an example package in accordance with one or more embodiments.

FIG. 3 illustrates an example package in accordance with one or more embodiments. Package 302 can be, for example, a package 212 of FIG. 2. A package 302 includes one or more files 304, which can include various components or modules for one or more applications. Package 302 also includes a manifest 306 that includes various metadata indicating actions to be taken to install package 302. Manifest 306 is associated with package 302 and identifies how to install the package, such as which files are to be written to disk, what configuration values are to be set (e.g., in an operating system registry or store), and so forth.

Manifest 306 includes a package identifier 308, which includes various elements. In the illustrated example, the elements of package identifier 308 are a name 312, a publisher 314, an architecture 316, a resource type 318, and a version 320. Name 312 is a name assigned to package 302 by the developer of package 302. The developer can choose any name they desire. Publisher 314 is a name of the publisher of package 302, which is typically the developer or distributor of package 302. The publisher can identify various entities such as a corporation, an individual, etc. Architecture 316 refers to the processor and/or device architecture with which the components or modules of package 302 are designed to operate. The developer can choose one or more architecture identifiers to include as architecture 316. Various different processor and/or device architectures can be identified, such as an x86 architecture, an x64 architecture, a RISC (reduced instruction set computer architecture), and so forth. Version 320 is a version identifier of package 302. The developer can choose any versioning indications (e.g., numeric sequences, alphanumeric sequences, etc.) that they desire.

Resource type 318 can be any of a variety of different values or attributes identifying characteristics of package 302. The developer can choose any characteristics that they desire. These characteristics can include, for example, the country or geographic region in which the components or modules of package 302 are designed to operate, the language (e.g., English, French, Japanese, etc.) that the components or modules of package 302 use, a form factor (e.g., desktop/laptop, tablet/slate, etc.) for which the components or modules of package 302 are designed to operate, one or more screen resolutions for which the components or modules of package 302 are designed to operate, whether the package 302 includes trial versions or fully licensed versions of applications, and so forth.

Although illustrated as including a name 312, a publisher 314, an architecture 316, a resource type 318, and a version 320, it should be noted that in other embodiments package identifier 308 can include other combinations of elements. For example, in some embodiments additional elements (not shown) can be included in package identifier 308. By way of another example, in some embodiments one or more of these elements (e.g., architecture 316, resource type 318, and/or version 320) may not be included in package identifier 308. Additionally, in one or more embodiments some elements of package identifier 308 can be required to be included (e.g., package identifier 308 is required to have values for those elements in order for an operating system (e.g., operating system 202 of FIG. 2) to use the package identifier), whereas other elements of package identifier 308 can be optional (e.g., package identifier 308 may or may not have values for those elements in order for an operating system (e.g., operating system 202 of FIG. 2) to use the package identifier).

A package certificate 330 is also associated with package 302. Package certificate 330 is a digital certificate that can be generated in a variety of conventional manners, such as by a trusted entity digitally signing package 302 and/or manifest 306 using public key cryptography. Package certificate 330 includes an identifier of the publisher of package 302, which is verified as being the same as publisher 314 when installing package 302, as discussed in more detail below.

The files 304 included in package 302, as well as the components or modules included in each file 304, are determined by the developer of package 302. For example, a developer could choose to distribute word processing and spreadsheet applications separately, creating one package for the word processing application and another package for the spreadsheet application. In such situations, these two packages have different package identifiers, so different package identifiers would be used when using the word processing and spreadsheet applications. Alternatively, a developer could choose to distribute word processing and spreadsheet applications together as a suite of applications, creating a single package including both the word processing and spreadsheet applications. In such situations, the single package has a package identifier, so the same package identifier would be used when using the word processing and/or spreadsheet applications.

Returning to FIG. 2, one or more applications included in package 212 are installed on computing device 200 by deployment module 204. As part of the installation or deployment, deployment module 204 verifies that the publisher identified in the package certificate associated with package 212 (e.g., package certificate 330 of FIG. 3) has not been altered or tampered with. The package certificate associated with package 212 includes an identifier of the publisher of package 212 that is digitally signed by a trusted entity, allowing deployment module 204 to readily verify the digital signature and verify that the publisher identified in the package certificate associated with package 212 has not been altered or tampered with. If the publisher identified in the package certificate associated with package 212 has been altered or tampered with, then deployment module 204 does not install the one or more applications in package 212.

However, if the publisher identified in the package certificate associated with package 212 has not been altered or tampered with, then deployment module 204 verifies that the publisher identified in the package certificate associated with package 212 is the same as the publisher in the package identifier 214 of package 212 (e.g., publisher 314 of FIG. 3). Deployment module 204 installs the one or more applications in package 212 if the publisher identified in the package certificate associated with package 212 is the same as the publisher in package identifier 214. If the publisher identified in the package certificate associated with package 212 is not the same as the publisher in package identifier 214, then deployment module 204 does not install the one or more applications in package 212.

Deployment engine 204 also maintains a package store 216, in which deployment engine 204 stores various information regarding packages installed on computing device 200, including an identification of each package (e.g., the package identifier of the package) installed on computing device 200 and the manifests associated with packages installed on computing device 200. Deployment module 204 records, during installation or deployment of the one or more applications in package 212, a record of package identifier 214 in package store 216. The package identifier in store 216 is maintained or otherwise indicated as being associated with the one or more applications installed from package 212. The package identifiers in package store 216 are maintained in a protected manner, allowing the package identifiers to be accessed by operating system 202 but not by other processes running on computing device 200. Thus, a process created from an application installed from package 212 would not have access to the package identifier stored in package store 216. The package identifiers can be protected in a variety of different manners, such as maintaining package store 216 in a location of memory that is only accessible to operating system 202, storing package identifiers in a data structure that is encrypted using a key known only to operating system 202, and so forth.

Package identifier 214 can be based on various elements as discussed above. In one or more embodiments, the package identifier 214 is stored in package store 216 as the package identifier for package 212. Alternatively, a subset of the elements in package identifier 214 are stored in package store 216 rather than all of the elements in package identifier 214. For example, the name and publisher from package identifier 214 (which together may be referred to as a family identifier of the package) can be stored in package store 216 and used as the package identifier for package 212. Alternatively, multiple different package identifiers can be stored in package store 216 as package identifiers for package 212, and these different package identifiers can be used by operating system 202 for different purposes. For example, one package identifier for package 212 in store 216 may be package identifier 214 and may be used by operating system 202 for one set of functionality, and another package identifier for package 212 in store 216 may be a subset of the elements in package identifier 214 and may be used by operating system 202 for a different set of functionality.

Additionally, as part of the installation or deployment process, deployment module 204 can generate or select one or more folders (or directories) of a storage device of computing device 200 in which the applications in package 212 can store data, settings, and so forth. The names of the one or more folders can optionally be based on the package identifier (e.g., the name of a root folder of the one or more folders can be the package identifier, or some name derived from the package identifier). The one or more folders are dedicated to applications in package 212, with applications in other packages being prevented from accessing (e.g., writing to and/or reading from) the folder. Deployment module 204 can further configure an access control list (ACL) for one or more folders, adding a security identifier (SID) generated based on the package identifier of package 212 in package store 216. This SID based on the package identifier is also referred to as the package identifier SID. Generating the SID based on the package identifier includes generating the SID based on all elements of the package identifier of package 212, or based on only a subset of the elements (e.g., the family identifier of the package—the name and publisher from the package identifier). The SID can be generated in various manners, and the ACL can be used to restrict access to that folder to just processes created from an application installed from package 212, as discussed in more detail below.

Similarly, deployment module 204 can generate ACLs for each of one or more other resources of computing device 200. Generally, a resource of computing device 200 refers to a device, module, component, file, or capability of computing device 200 that a process may desire to access. Thus, a resource can be a hardware component of computing device, a module or component in a package (e.g., package 212), and so forth. For example, a resource can be a group of folders (or directories), a storage device or volume, a network adapter, a camera, and so forth. Deployment module 204 can add a SID generated based on the package identifier of package 212 in package store 216 to such ACLs to allow processes created from an application installed from package 212 to access those resources. To which resource ACLs the SID is added can be determined in different manners, such as based on information in a manifest of package 212, selections made by a user during installation of the one or more applications in package 212, and so forth.

Alternatively, rather than adding a package identifier SID to an ACL of a resource, additional SIDs referred to as capability SIDs can be added to the ACLs of resources. The capabilities of one or more components or modules included in a package are identified in the manifest of the package. These capabilities can include accessing particular resources, accessing particular types or classes of resources, and so forth. Capability SIDs for the capabilities of the one or more components included in the package are added to a capability store, and the package identifier SID is added to an ACL associated with the stored capabilities for the package. Including the package identifier SID in the ACL associated with the stored capabilities for the package allows the processes created from an application installed from package 212 to use the capability SIDs to access the resources. Thus, the package identifier SID is used to gain access to SIDs that in turn allow access to the resources.

When an application begins running on computing device 200, process creation module 206 manages the creation of one or more processes on computing device 200 for that application. Process creation module 206 assigns the package identifier to the one or more processes, typically using a process token although other techniques can alternatively be used. The package identifier associated with the application can be identified in different manners. For example, shortcuts or menu items identifying the application can, when the application is installed, include the package identifier associated with the application. Such shortcuts or menu items can provide the package identifier to process creation module 206 when selected by a user to run the application. By way of another example, when a user requests to run an application, process creation module 206 can obtain the package identifier associated with the application from package store 216.

When creating a process, process creation module 206 generates a process token for the application that includes various metadata regarding the process, including a SID based on the package identifier associated with the application. The SID based on the package identifier can be generated in a variety of different manners, such as by using one or more elements of the package identifier as the SID or generating another value based on the package identifier. In one or more embodiments, the package identifier (or a subset of the elements of the package identifier) is input to a message authentication code (MAC) or hash-based message authentication code (HMAC), or other key derivation function. For example, the package identifier can be input to a DES3-CBC-MAC (Triple Data Encryption Standard Cipher Block Chaining Message Authentication Code), an HMAC with SHA-1 (Secure Hash Algorithm 1), and so forth. The output of the MAC, HMAC, or other hash or key derivation function is the SID based on the package identifier.

Thus, each process created for an application installed from package 212 includes a process token with a SID based on the package identifier of package 212. It should be noted that if a process spawns one or more other processes, each of those one or more other processes inherit the same process token. Thus, each of those one or more other processes also includes a process token with a SID based on the package identifier of package 212.

The SID in the process token based on the package identifier is flagged, identified, or otherwise stored in the process token in a manner that identifies the SID as being a package identifier SID. A process token can optionally have multiple additional types of SIDs based on other criteria (e.g., a user name or account, a group name, etc.). These additional types of SIDs can be used in various conventional manners to control access to resources. However, as the package identifier SID is identified as being a package identifier SID, the package identifier SID can be identified by the operating system to determine whether the process can access particular resources, other processes, and so forth as discussed below. Thus, support for SIDs that may already be included in various operating systems or devices can be leveraged using the techniques discussed herein, extending the support in those operating systems or devices to use the package identifier SID discussed herein.

It should be noted that operating system 202 generates the process tokens, and does not allow a process to modify a process token (its own process token or any other process token). Accordingly, the package identifier SID in the process token can be trusted, as the operating system 202 knows that a process cannot alter its own process token in an attempt to access processes or resources that the process is not permitted to access.

When a process desires to access a folder or other resource having an ACL, security module 208 compares the package identifier SID in the process token to the ACL of the folder or other resource. The ACL can include different portions for different types of SIDS, and thus security module 208 compares the package identifier SID in the process token to the appropriate part of the ACL. If the ACL of the folder or other resource indicates that the SID is allowed to access the folder or other resource, then security module 208 allows the process to access the folder or other resource. However, if the ACL of the folder or other resource indicates that the SID is not allowed to access the folder or other resource, then security module 208 prevents the process accessing the folder or other resource. A process can be prohibited from accessing a folder or other resource in different manners, such as by refusing to pass a request to the folder or other resource, notifying another module or component that the process is not permitted to access the folder or other resource, and so forth. An ACL can indicate whether a package identifier SID is allowed to access a folder or other resource in various manners, such as by including in the ACL the package identifier SIDs that are allowed to access the folder or other resource, including in the ACL the package identifier SIDs that are not allowed to access the folder or other resource, and so forth. Alternatively, the package identifier SID may be used to obtain one or more capability SIDs as discussed above, and the capability SIDs are compared to the ACL of the folder or other resource rather than the package identifier SID.

It should be noted that package identifier SIDs and/or capability SIDs can be added to the ACL of a folder or other resource prior to the package identifier for a package being obtained (or even existing). For capability SIDs, the package identifier SID is used to gain access to SIDs that in turn allow access to the resources as discussed above, so the package identifier SID need not be obtained prior to adding a capability SID to an ACL. For package identifier SIDs, the package identifier SIDs can be based on a family identifier of the package, which excludes a version number. Thus, a package identifier SID based on the family identifier of a previous version of a package can be added to an ACL before a subsequent version of the package is obtained (or even exists).

The package identifier SID in the process token can also be used to determine whether a process can access another process (which does not have an ACL). Such accesses can be performed using a variety of different inter-process communication techniques, such as remote procedure calls, messaging, and so forth. When a process desires to access another process, security module 208 compares the package identifier SID of that process to the package identifier SID of the other process. If the two package identifier SIDs match (e.g., are the same), then security module 208 allows that process to access the other process. However, if the two package identifier SIDs do not match (e.g., are not the same), then security module 208 prevents that process from accessing the other process. A process can be prohibited from accessing another process in different manners, such as by refusing to pass a call or message to the other process, notifying another module or component that the process is not permitted to access the other process, and so forth.

Figure 4:
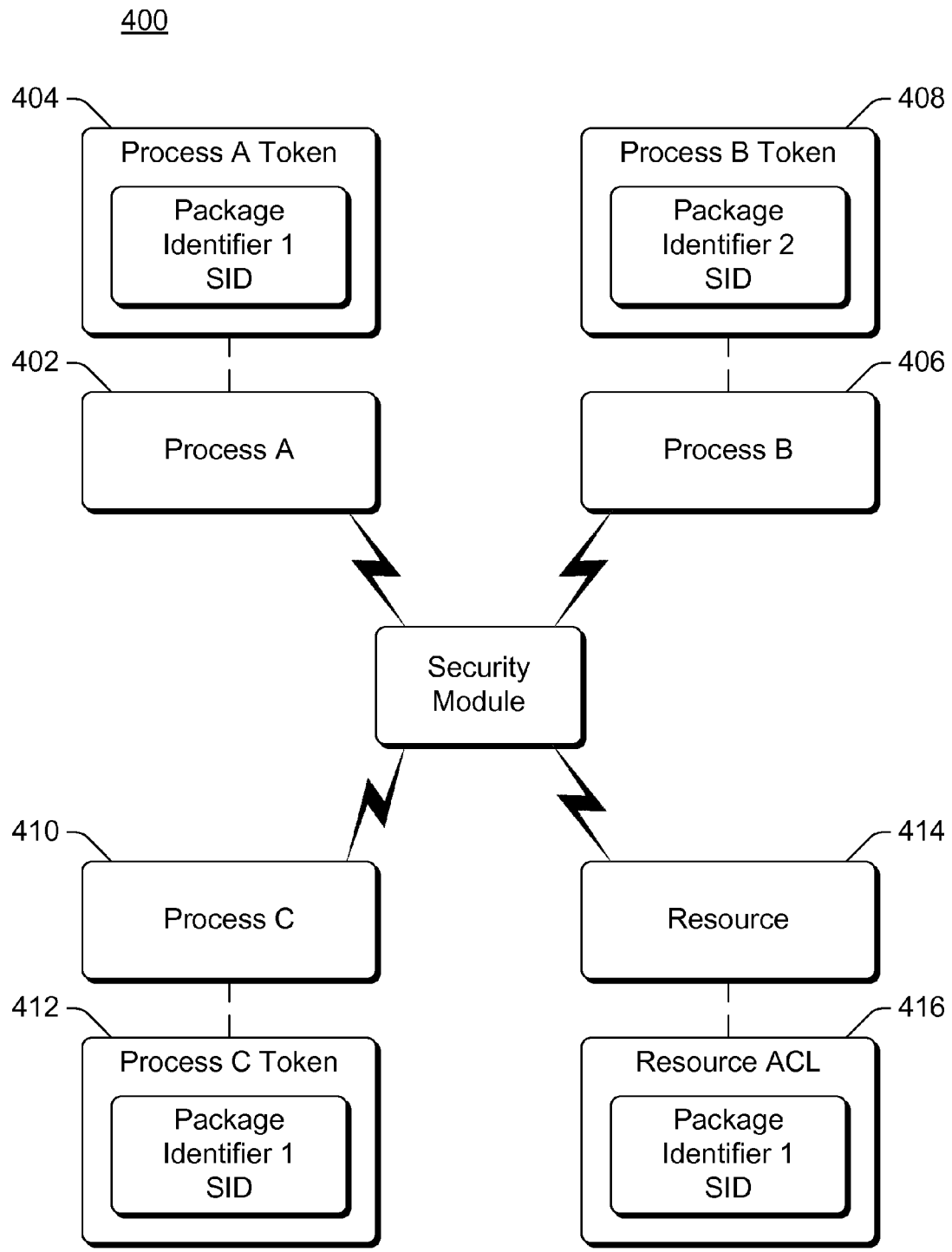
FIG. 4 illustrates an example system using security identifiers based on package identifiers in accordance with one or more embodiments.

FIG. 4 illustrates an example system 400 using security identifiers based on package identifiers in accordance with one or more embodiments. System 400 includes a process 402 having an associated process token 404, a process 406 having an associated process token 408, a process 410 having an associated process token 412, and a resource 414 having an associated ACL 416. Security module 208 receives requests from processes 402, 406, and 410 to access other processes and/or resource 414. Whether security module 208 permits a particular process 402, 406, or 410 to access another process and/or resource 414 is based on the package identifier SID in the security token of the requesting process.

For example, process token 404 and process token 412 both include a SID based on a particular package identifier (referred to as package identifier 1). If process 402 were to request to access process 410, then security module 208 would permit the access because the SIDs of processes 402 and 412 are the same. However, process token 408 has a SID based on a different package identifier (referred to as package identifier 2). If process 402 were to request to access process 406, then security module 208 would not permit the access because the SIDs of processes 402 and 406 are not the same. Further, assume ACL 416 indicates that a process with a SID based on package identifier 1 is allowed to access resource 414, but processes with SIDs based on other package identifiers are not allowed to access resource 414. If process 402 or process 410 were to request to access resource 414, then security module 208 would permit the access because ACL 416 indicates that the SIDs of processes 402 and 410 are permitted to access resource 414. However, if process 406 were to request to access resource 414, then security module 208 would not permit the access because ACL 416 indicates that the SID of process 406 is not permitted to access resource 414.

Alternatively, the package identifier SID may be used to obtain one or more capability SIDs as discussed above. Thus, resource ACL 416 would include a capability SID rather than a package identifier SID (e.g., rather than the package identifier 1 SID).

Returning to FIG. 2, operating system 202 can use package identifier 214 to facilitate various other functionality as well. In one or more embodiments, package identifier 214 is used to facilitate uninstalling or removing applications in package 212 from computing device 212. One or more folders of a storage device can be dedicated to the applications in package 212 as discussed above. Thus, the data, settings, and so forth for the applications in the package 212 can be readily deleted because they will all be stored in those one or more dedicated folders of the storage device. Additionally, operating system 202 can readily identify and terminate any processes created from applications in package 212 because those processes will have process tokens including a SID based on package identifier 214.

Additionally, in one or more other embodiments package identifier 214 is used to facilitate servicing applications installed on computing device 212 from package 212. The version of the applications already installed, and thus whether some other package includes a newer version, can be readily identified based on the information stored in package store 216. For example, the package identifiers for two versions of the same package would have the same elements except for the version identifiers. Which version is newer can be readily determined based on the manner in which versioning is indicated (e.g., the larger or higher number may be the newer version). Furthermore, to update the applications operating system 202 can readily identify and shut down any processes created from applications in package 212 because those processes will have process tokens including a SID based on package identifier 214. Operating system 202 can optionally maintain a record of the processes that are shut down, and restart those processes after the applications are updated.

In addition, in one or more other embodiments package identifier 214 is used to facilitate logging activity on computing device 212. Operating system 202 can maintain a log for various actions performed by processes running on computing device 200, such as resources accessed, processes accessed, capabilities accessed, and so forth. Because each process created from applications in package 212 includes a SID based on package identifier 214 in its process tokens, when an action is performed operating system 202 can maintain a record of the SID of the process that performed the action. Thus, an indication of an application from which package performed which actions can be readily maintained.

It should be noted that in some situations, package 212 can be dependent on one or more other packages that are referred to as dependency packages. These dependency packages can be created by the same developer as creates package 212, or alternatively another developer. One package is dependent on another package if the one package relies on that other package to be present (installed) in order for an application in the one package to function correctly when running. The manifest associated with package 212 also includes dependency information for the package, identifying other packages (if any) that package 212 is dependent on. Operating system 202 can maintain a record identifying each package (and manifest of each such package) installed on computing device 200, and for each such package an identification of any other packages that the package is dependent on. The dependency information can be maintained using a table, dependency graph, or alternatively a variety of other conventional data structures.

In one or more embodiments, package identifier 214 is used to facilitate loading of code libraries (e.g., dynamic link libraries) by a process. In response to loading of a library being requested by a component or module of package 212, operating system 202 (e.g., a load library module of operating system 202) verifies that the requested library is identified in the manifest of package 212 or in the manifest of a dependency package of package 212. If the requested library is identified in the manifest of package 212 or in the manifest of a dependency package of package 212, then operating system loads the requested library. However, if the requested library is not identified in the manifest of package 212 and is not identified in the manifest of a dependency package of package 212, then operating system 202 does not load the requested library.

Additionally, in one or more other embodiments package identifier 214 is used to facilitate streaming of code to computing device 200. Streaming code to computing device 200 refers to streaming package 212 to computing device 200 from another device, typically over a network. Operating system 202 uses the dependencies for package 212 to ensure that the dependencies of a package have been received at computing device 200 before the application in the package is run. Additionally, the package identifier can be used to allow operating system 202 to readily determine, for streaming code received at computing device 200, a process that the streaming code is associated with (e.g., is part of the same package as) because the process will have a process token including a SID based on package identifier 214.

Figure 5:
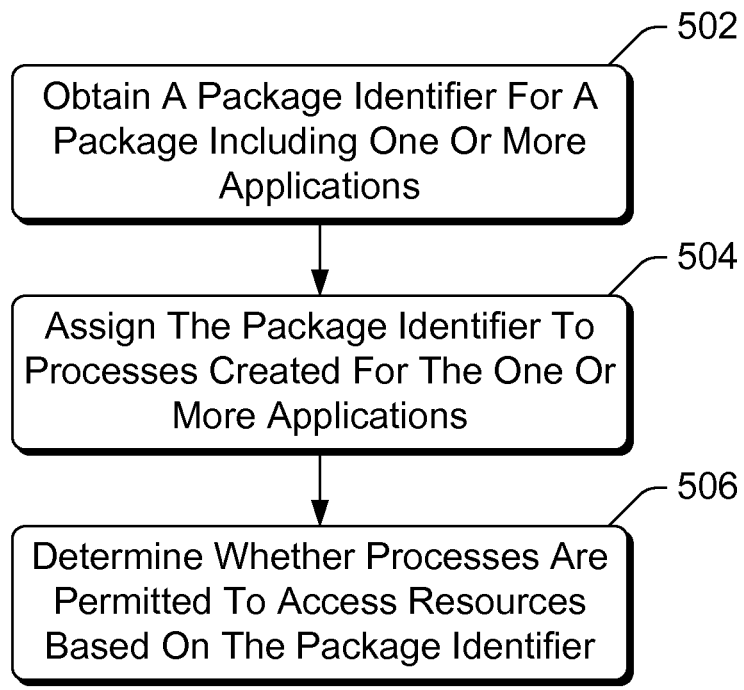
FIG. 5 is a flowchart illustrating an example process for implementing pervasive package identifiers in accordance with one or more embodiments.

FIG. 5 is a flowchart illustrating an example process 500 for implementing pervasive package identifiers in accordance with one or more embodiments. Process 500 is carried out by a device, such as computing device 102 of FIG. 1 or computing device 200 of FIG. 2, and can be implemented in software, firmware, hardware, or combinations thereof. Process 500 is shown as a set of acts and is not limited to the order shown for performing the operations of the various acts. Process 500 is an example process for implementing pervasive package identifiers; additional discussions of implementing pervasive package identifiers are included herein with reference to different figures.

In process 500, a package identifier for a package from which one or more applications are installed on the computing device is obtained (act 502). The package identifier can include various elements as discussed above. The package identifier can be obtained during installation of the one or more applications, or alternatively prior to installation of the one or more applications (e.g., can be obtained from a manifest of the package before the one or more applications are installed).

The package identifier is assigned to processes created for the one or more applications installed from the package (act 504). The package identifier can be included in its entirety, or a subset of the elements of the package identifier can be assigned to processes as discussed above. The package identifier can be assigned to the processes by adding a security identifier based on the package identifier to a process token of each of the processes as discussed above. One or more folders or directories associated with the one or more applications can also be created with ACLs including a SID based on the package identifier, as discussed above.

A determination is made, based at least in part on the package identifier, whether the one or more processes are permitted to access resources of the computing device (act 506). As discussed above, this determination can be made by comparing the package identifier security identifier and/or capability security identifier for a process to an access control list of the resource.

Figure 6:
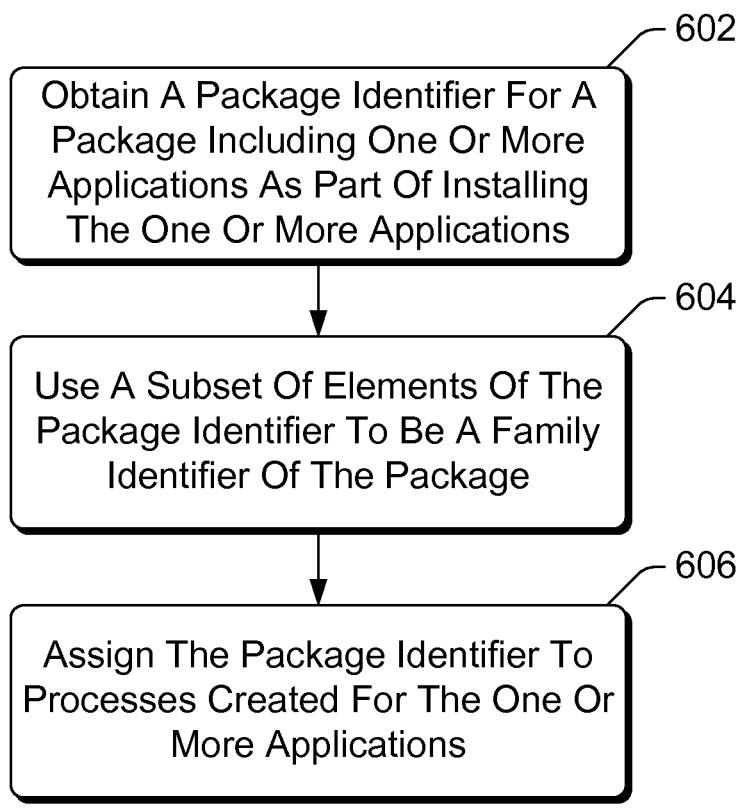
FIG. 6 is a flowchart illustrating another example process for implementing pervasive package identifiers in accordance with one or more embodiments.

FIG. 6 is a flowchart illustrating another example process 600 for implementing pervasive package identifiers in accordance with one or more embodiments. Process 600 is carried out by a device, such as computing device 102 of FIG. 1 or computing device 200 of FIG. 2, and can be implemented in software, firmware, hardware, or combinations thereof. Process 600 is shown as a set of acts and is not limited to the order shown for performing the operations of the various acts. Process 600 is an example process for implementing pervasive package identifiers; additional discussions of implementing pervasive package identifiers are included herein with reference to different figures.

In process 600, a package identifier for a package is obtained as part of installing one or more applications from the package on the computing device (act 602). The package identifier can include various elements as discussed above.

A subset of elements of the package identifier are used as a family identifier of the package (act 604). The subset of elements includes a publisher of the package, and can be both the name assigned to the package and the publisher of the package as discussed above.

The family identifier is assigned to processes created for the one or more applications installed from the package (act 606). The family identifier can be assigned to the processes by adding a security identifier based on the family identifier to a process token of each of the processes as discussed above.

The pervasive package identifiers techniques discussed herein support various usage scenarios. The package identifiers are pervasive in a computing device, being used for installation as well as during runtime (e.g., as a basis for security identifiers). Processes created for an application installed on the computing device have a security identifier based on the package identifier, and the security identifier can be used for various functions as discussed above.

Figure 7:
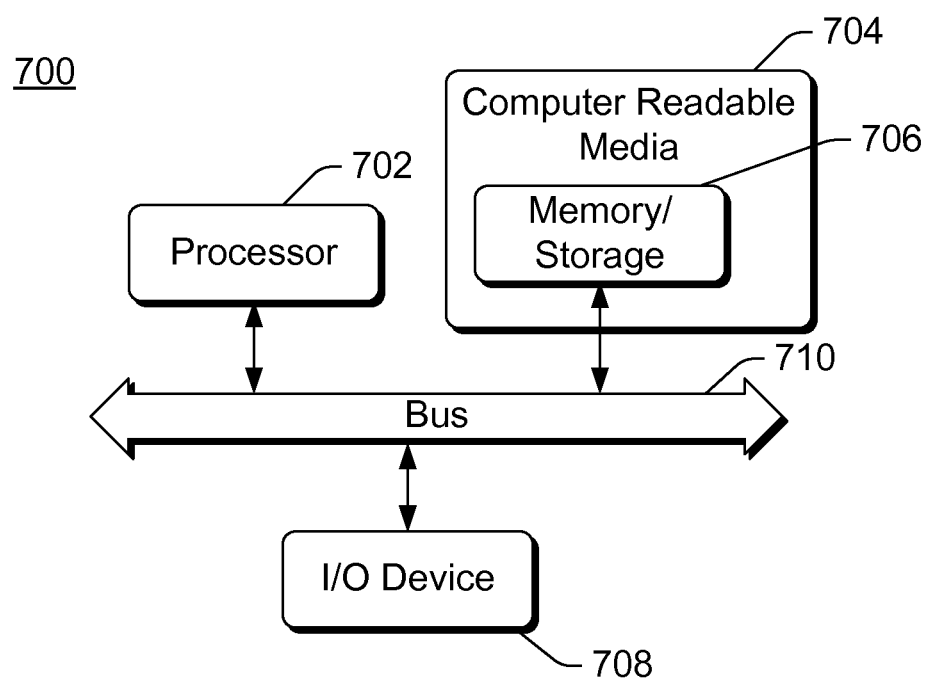
FIG. 7 illustrates an example computing device that can be configured to implement the pervasive package identifiers in accordance with one or more embodiments.

FIG. 7 illustrates an example computing device 700 that can be configured to implement the pervasive package identifiers in accordance with one or more embodiments. Computing device 700 can be, for example, computing device 102 of FIG. 1 or computing device 200 of FIG. 2.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Processor 702, computer readable media 704, one or more of devices 708, and/or bus 710 can optionally be implemented as a single component or chip (e.g., a system on a chip). Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the pervasive package identifiers techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining, at a computing device for an application installed on the computing device from a package, a package identifier for the package, the package identifier including an identifier of an architecture of computing devices on which the application is designed to operate, the application having been installed only if a publisher of the package included in the package identifier was verified as being the same as the publisher included in a digital certificate associated with the package;
    maintaining the package identifier in a protected manner such that the package identifier is accessible to an operating system of the device but not accessible to other applications of the device;
    assigning the package identifier to each of one or more processes created for the application, wherein each process created for the application includes a process token generated by the operating system of the computing device, the process incapable of modifying the process token; and
    determining, based at least in part on the package identifier, for each of the one or more processes whether the process is permitted to access a resource of the computing device.

2. The method as recited in claim 1, the package identifier further including a name of the package and a name of the publisher of the package.

3. The method as recited in claim 2, the package identifier further including an indication of a version of the package and a value identifying a resource type of the package.

4. The method as recited in claim 1, the package including one or more components or modules of one or more applications.

5. The method as recited in claim 1, the assigning comprising generating a security identifier based on the package identifier or family identifier of the package, and adding the security identifier to the process token of each of the one or more processes.

6. The method as recited in claim 5, the determining comprising allowing, for each of the one or more processes, the process to access a folder of a storage device of the computing device only if an access control list associated with the folder indicates the security identifier of the process is permitted to access the folder.

7. The method as recited in claim 5, the determining further comprising allowing, for each of the one or more processes, the process to access an additional process in the computing device only if the security identifier of the process and the security identifier of the additional process are the same.

8. The method as recited in claim 5, the generating the security identifier comprising inputting one or more elements of the package identifier to a hash function to generate a hash value, and using the hash value as the security identifier.

9. The method as recited in claim 1, the obtaining a package identifier for the package comprising obtaining the package identifier for the package from a manifest associated with the package.

10. The method as recited in claim 1, further comprising, in response to loading of a library being requested:
    loading the library if the library is identified in a manifest of the package or in a manifest of a dependency package of the package; and
    otherwise not loading the library.

11. The method as recited in claim 1, further comprising determining a process with which streaming code received by the computing device is associated based on the package identifier.

12. One or more computer storage media having stored thereon multiple instructions that, when executed by one or more processors of a computing device, cause the one or more processors to:
    obtain, at the computing device as part of installing one or more applications from a package on the computing device, a package identifier from the package, the package identifier including an identifier of an architecture of computing devices on which the application is designed to operate, the one or more applications being installed only if a publisher of the package included in the package identifier is the same as the publisher included in a digital certificate) associated with the package;
    maintain the package identifier in a protected manner such that the package identifier is accessible to an operating system of the device but not to other applications of the device;
    use a subset of elements of the package identifier to be a family identifier of the package; and
    assign the family identifier to each of one or more processes created for running the one or more applications, wherein each process created for an application comprises a process token with a security identifier based on the package identifier, the security identifier stored in the process token in a manner) that identifies the security identifier as being a package identifier security identifier.

13. One or more computer storage media as recited in claim 12, the package identifier being obtained from a manifest associated with the package.

14. One or more computer storage media as recited in claim 12, the subset of elements including a name of the package and a name of the publisher of the package.

15. One or more computer storage media as recited in claim 12, the package including one or more components or modules of one or more applications.

16. One or more computer storage media as recited in claim 12, the instructions causing the one or more processors to assign the family identifier to each of the one or more processes comprising instructions causing the one or more processors to generate a security identifier based on the family identifier and add the security identifier to the process token of each of the one or more processes.

17. One or more computer storage media as recited in claim 16, the multiple instructions further causing the one or more processors to allow, for each of the one or more processes, the process to access a folder of a storage device of the computing device only if an access control list associated with the folder indicates the security identifier of the process is permitted to access the folder.

18. One or more computer storage media as recited in claim 16, the multiple instructions further causing the one or more processors to allow, for each of the one or more processes, the process to access an additional process in the computing device only if the security identifier of the process and the security identifier of the additional process are the same.

19. A method comprising:

obtaining, at a computing device as part of installing one or more applications from a package on the computing device, a package identifier from the package, the package identifier including a name of the package, a name of a publisher of the package, an identifier of an architecture of computing devices on which the application is designed to operate, an indication of a version of the package, and a value identifying a resource type of the package, the one or more applications being installed only if the publisher of the package included in the package identifier is verified to be the same as the publisher included in a digital certificate associated with the package;

maintaining the package identifier in a protected manner such that the package identifier is accessible to an operating system of the device but not to other applications of the device;

using a subset of elements of the package identifier to be a family identifier of the package, the subset of elements including the name of the package and the name of the publisher of the package;

assigning the family identifier to each of one or more processes created for running the one or more applications by generating a security identifier based on the family identifier and adding the security identifier to a process token of each of the one or more processes; and responsive to the one or more processes spawning one or more other processes, causing the one or more other processes to inherit the same process token.

* * * * *